United States Patent
Harder et al.

(10) Patent No.: US 8,280,585 B2
(45) Date of Patent: Oct. 2, 2012

(54) CONTROL METHOD FOR ADJUSTING ELECTRONICALLY CONTROLLED DAMPING SYSTEM IN MOTOR VEHICLES AND AN ELECTRONICALLY CONTROLLED DAMPING SYSTEM

(75) Inventors: Michael Harder, Bodenheim (DE); Mike Rödder, Windeck (DE)

(73) Assignee: GM Global Technology Operations LLC, Detroit, MI (US)

( * ) Notice: Subject to any disclaimer, the term of this patent is extended or adjusted under 35 U.S.C. 154(b) by 712 days.

(21) Appl. No.: 12/065,919

(22) PCT Filed: Sep. 9, 2006

(86) PCT No.: PCT/EP2006/008797
§ 371 (c)(1), (2), (4) Date: Oct. 17, 2008

(87) PCT Pub. No.: WO2007/031243
PCT Pub. Date: Mar. 22, 2007

(65) Prior Publication Data
US 2009/0043451 A1     Feb. 12, 2009

(30) Foreign Application Priority Data
Sep. 12, 2005 (DE) .................. 10 2005 043 555

(51) Int. Cl.
*B60G 17/00* (2006.01)
(52) U.S. Cl. ............... 701/37; 280/5.515; 280/124.108
(58) Field of Classification Search ............... 701/37, 701/38; 280/5.5, 5.513–5.515, 124.1, 124.101, 280/124.108
See application file for complete search history.

(56) References Cited

U.S. PATENT DOCUMENTS

| | | | | |
|---|---|---|---|---|
| 4,589,676 A | * | 5/1986 | Meloche et al. | 280/5.515 |
| 5,086,656 A | | 2/1992 | Schwendemann et al. | |
| 5,089,966 A | * | 2/1992 | Fukushima et al. | 701/38 |
| 5,374,077 A | * | 12/1994 | Penzotti et al. | 280/683 |
| 5,944,763 A | | 8/1999 | Iwasaki | |
| 6,026,339 A | * | 2/2000 | Williams | 701/37 |
| 6,157,295 A | * | 12/2000 | Steiner et al. | 340/440 |
| 6,502,837 B1 | * | 1/2003 | Hamilton et al. | 280/5.515 |
| 7,040,632 B2 | * | 5/2006 | Burdock et al. | 280/5.515 |
| 7,333,882 B2 | * | 2/2008 | Uchino et al. | 701/37 |

(Continued)

FOREIGN PATENT DOCUMENTS
CN         1110230 A     10/1995
(Continued)

OTHER PUBLICATIONS
International Searching Authority, International Search Report for Application No. PCT/EP2006/008797, dated Feb. 20, 2007.
(Continued)

*Primary Examiner* — Paul N Dickson
*Assistant Examiner* — Timothy Wilhelm
(74) *Attorney, Agent, or Firm* — Ingrassia Fisher & Lorenz, P.C.

(57) ABSTRACT

A control method is provided for an electronically controlled damping system in a vehicle, wherein at least one characteristic quantity varying with different axle load conditions of an axle of the vehicle is determined, a correcting variable is established for an actuator of a vibration damper based on the characteristic quantity and the correcting variable is transmitted to the actuator of the vibration damper to adjust a desired damping behavior of the vibration damper.

7 Claims, 1 Drawing Sheet

U.S. PATENT DOCUMENTS

| | | | |
|---|---|---|---|
| 7,813,850 B2 * | 10/2010 | Mannerfelt | 701/30 |
| 2005/0085970 A1 * | 4/2005 | Song et al. | 701/38 |
| 2005/0228563 A1 * | 10/2005 | Manzoor et al. | 701/37 |

FOREIGN PATENT DOCUMENTS

| | | |
|---|---|---|
| DE | 3912144 A1 | 10/1990 |
| DE | 4403196 A1 | 8/1994 |
| DE | 4436441 | 4/1995 |
| DE | 19640820 A1 | 4/1997 |
| DE | 102007049445 A1 | 4/2009 |
| DE | 102010005235 A1 | 7/2011 |
| EP | 0215315 | 3/1987 |
| EP | 1623856 A2 | 2/2006 |
| JP | 07061221 A * | 3/1995 |

OTHER PUBLICATIONS

German Patent Office, German Search Report for Application No. 102005043555.6, dated Apr. 24, 2006.

European Patent Office, European Office Action for Application 06791947.2, dated Apr. 8, 2010.

* cited by examiner

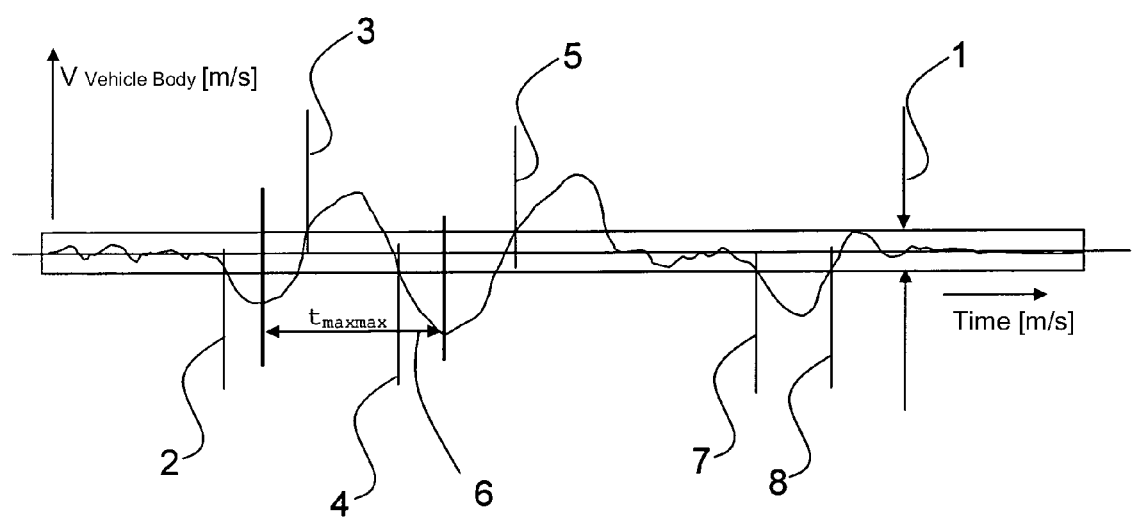

CONTROL METHOD FOR ADJUSTING ELECTRONICALLY CONTROLLED DAMPING SYSTEM IN MOTOR VEHICLES AND AN ELECTRONICALLY CONTROLLED DAMPING SYSTEM

CROSS-REFERENCE TO RELATED APPLICATIONS

This application is a U.S. National-Stage entry under 35 U.S.C. §371 based on International Application No. PCT/EP2006/008797, filed Sep. 9, 2006, which was published under PCT Article 21(2) and which claims priority to German Application No. DE 10 2005 043 555.6, filed Sep. 12, 2005.

TECHNICAL FIELD

The technical field generally relates to automotive engineering and more specifically relates to a control method for electronically controlled damping systems in vehicles, and to an electronically controlled damping system for this purpose.

BACKGROUND

Modern motor vehicles are often already fitted with an electronically controlled damping system as standard by which the damping behavior of controllable vibration dampers (for example wheel-guiding suspension struts) on the wheel suspensions can be controlled. More precisely, a controlled damping system of this type usually comprises three sensors fitted on the vehicle body which are able to detect a speed of the vehicle body, assumed as being a rigid plate, relative to the chassis in a perpendicular (vertical) direction to the surface of the roadway. Furthermore, the vibration dampers are each provided with sensors which can detect a (vertical) upwards and downwards movement or corresponding speeds of the vehicle wheels. The various sensors transmit the detected speed data to an open-and closed-loop control unit of the damping system, which open-and closed-loop control unit for its part is actively connected to actuators of the controllable vibration dampers. In the open-and closed-loop control unit, vertical movements or speeds of the vehicle body relative to the chassis are compared with vertical speeds of the wheels on the wheel suspensions on the basis of the speed data from the sensors, the speeds emerging from the respective differences during the compression/recoil of the vibration dampers. A control value for the actuators of the vibration dampers is then determined from this data using a program map and is transmitted to the actuators, as a result of which a desirable damping behavior of the vibration dampers on the wheel suspensions can be obtained. In order to achieve a control of the damping system which is adapted as effectively as possible to the respective driving situation, further sensors are provided for the most part to detect the vehicle speed, the vehicle lateral acceleration (for example using a steering angle sensor) and the variation in the vehicle lateral acceleration (for example using a step steering input sensor).

The aim of every controlled vehicle damping system is to influence in a desirable manner the vibration behavior of a motor vehicle, i.e. the manner in which the vehicle body moves with respect to the chassis when induced by the road (unevenness of the road). In this respect, a movement is generally desired in which the front axle and the rear axle of the vehicle are deflected outwards as far as possible in an identical manner with the same amplitude and come to rest again as far as possible at the same time, so that the vehicle body as such makes no pitching or rolling movements, or as few pitching or rolling movements as possible.

However, a disadvantage of conventional damping systems in vehicles is that a varying payload of the vehicle has only a very restricted influence on the speed, detected in conventional damping systems, of the vehicle body relative to the chassis. In this respect, hitherto it has only been possible to coordinate an inhibition of pitching and rolling movements of the vehicle body within the program map control with one specific reference condition, namely either for an empty vehicle or a vehicle for which a certain loading with persons and/or loaded freight is assumed. For this reason, conventional damping systems in vehicles have hitherto not afforded any possibility of considering different loading conditions of the vehicle which, however, can occur very often in the practical use of the vehicle, or any possibility of optimizing an inhibition of vibrations of the vehicle body under different loading conditions.

Thus, it is also known from practice that in the case of large vehicle payloads beyond a payload assumed for the vehicle reference condition of the program map control, a permanent underdamping of the vibration dampers, in particular of the rear axle of the vehicle can occur due to a load acting in a non-uniform manner on the axles, which permanent underdamping disadvantageously results in pitching movements of the vehicle body which can only be damped to a limited extent by the electronic damping system and, moreover, entail a relatively great expense in terms of control. Basically, a vibration damper cannot completely avoid movements, since only the movement itself produces a damping effect. This problem of a payload loading the axles in a non-uniform manner is accentuated in vehicles with a relatively low service weight, as in this case the payload has a greater effect compared to a vehicle which is heavier per se.

Pitching movements cannot, however, be completely avoided, as the front axle and the rear axle always pass over an obstacle in a delayed manner. (In practice, a certain remainder of pitching movements is allowed anyway, because too strong a compensation results in an uncomfortable "jarring", vibration behavior and rolling). Payload increases this ever present "residual pitching motion", resulting in an uncomfortable driving behavior. If the payload restricted by the manufacturer is exceeded, the driving behavior can even become uncontrollable.

Accordingly, an object of the present invention is to provide a method for the axle load-dependent or loading-dependent control of an electronically controlled damping system in a vehicle, and to provide a damping system of this type, with which it is possible to optimize, for different loadings of the vehicle, an inhibition/damping of vibrations, in particular pitch vibrations of the vehicle body which are caused in particular by a load stressing the axles non-uniformly.

SUMMARY

This object is achieved according to the proposal of the invention by a control method for an electronically controllable damping system in a vehicle and a damping system having the features as herein described in this summary, detailed description, claims, and drawings.

An exemplary embodiment provides for a method for the axle load-dependent or loading-dependent control of an electronically controlled damping system in a vehicle, in particular a motor vehicle, and an electronically controlled damping system. In this respect, the electronically controlled damping system comprises at least one electronically controllable vibration damper (for example in the form of a wheel-bearing suspension strut) with an electronically controllable actuator for adjusting its damping behavior (or damping effect). The damping behavior can be expressed, for example by a relatively hard or relatively soft damping characteristic of the vibration damper. The vibration damper is positioned on a wheel suspension of the vehicle, electronically controllable vibration dampers generally being provided on each wheel suspension of the vehicle. The electronically controlled damping system further comprises an open-and closed-loop control unit which is actively connected to the actuators of the vibration dampers for the open-loop/closed-loop control of the damping behavior of the controllable vibration dampers, and for this purpose correcting variables are transmitted from the open-and closed-loop control unit to the actuators of the vibration dampers. For their part, the vibration dampers are fitted with sensors which can detect a speed during the compression/recoil of the vibration dampers. Moreover, such sensors are generally able to detect the axial length of a vibration damper along the compression/recoil path. In addition, further sensors can be provided in a damping system of this type according to the invention to detect a vehicle speed, a vehicle lateral acceleration (for example using a steering angle sensor) and a vehicle lateral acceleration variation (for example using a step steering input sensor).

The embodiment of the method a for the axle load-dependent or loading-dependent control of an electronically controlled damping system, as described above, in a vehicle is substantially characterized in that at least one characteristic quantity which varies with different axle load conditions of an axle (e.g. rear axle) of the vehicle (otherwise expressed as vehicle loading conditions) is determined and, based on this characteristic quantity, a correcting variable is determined for the actuator of at least one vibration damper, which correcting variable is transmitted to the actuator to adjust a desirable damping behavior. In this respect, correcting variables are generally determined for the actuators of all vibration dampers of a respective vehicle axle and are transmitted to their actuators in order to adjust in this manner a desirable damping behavior for all vibration dampers of a vehicle axle.

In a motor vehicle which can be loaded at the rear end, as a result of which the axle load of the rear axle changes more markedly compared to the axle load of the front axle relative to the empty state, a respective correcting variable is thus typically determined for the vibration dampers of all the wheel suspensions of the rear axle and is transmitted to their actuators to adjust a desirable damping behavior.

In a particularly advantageous embodiment, respective correcting variables are determined not only for the vibration dampers of the rear axle, but also for vibration dampers of the wheel suspensions of the front axle and are transmitted to their actuators to adjust a desirable damping behavior. In this way, it is possible to determine the absolute payload and the distribution thereof over the front and rear axles, so that not only the vibration behavior, but also an absolute vehicle body movement can be brought to the level of a vehicle reference condition (for example vehicle empty state), as is established in the program map control of a conventional damping system. Thus, the vehicle movement can be coordinated (optimized) irrespective of the loading, i.e. for different payloads.

In another advantageous embodiment of the method, the characteristic quantity which varies with different axle load conditions of the vehicle is determined based on a natural frequency of vibrations of the vehicle body, as it has been found that a varying loading has a comparatively marked influence on the magnitude of the stroke movement (path distance) during the compression and recoil of the vibration dampers and on the natural frequency of the vehicle body (for example compared with the conventionally detected speed of the vibrations of the vehicle body) and thus can be easily detected. In a possible configuration of this embodiment, the natural frequency of the vehicle body can be determined based on a time interval of detected maximum vibration amplitudes of the vehicle body relative to the chassis. In a further possible configuration of this embodiment, the natural frequency of the vehicle body can be determined based on a time interval of detected maximum vibration speeds of the vehicle body relative to the chassis, which are merely phase shifted with respect to the maximum amplitudes of the vibrations. The sensors which are present anyway in conventional damping systems for detecting speeds of the vehicle body, as described above, can be used for this purpose. Nevertheless, further sensors can be provided or the sensors which are present can be provided with further functions, for example to detect the maximum amplitude of a vibration of the vehicle body.

In a further advantageous embodiment of the method, the characteristic quantity varying with different axle load conditions of the vehicle is determined based on a detected height level value of the vehicle body. A height level value of this type of the vehicle body is usually provided by a height level control device of the vehicle body, as is already present nowadays, for example in vehicles fitted with xenon light, since the legislator stipulates an automatic beam height control with xenon light. Nevertheless, the vehicle can be fitted additionally or alternatively with one or more suitable sensors for detecting a height level value of the vehicle body.

Provided in the electronically controlled damping system in a vehicle, in particular motor vehicle, for the purpose of the inventive axle load-dependent control of the damping behavior of vibration dampers is a characteristic quantity determining unit, to which the data detected by the respective sensors is fed as input data and the characteristic quantity varying with different axle load conditions of the vehicle is determined based on this input data. This characteristic quantity determining unit can be integrated into the open-and closed-loop control unit of the damping system. The characteristic quantities determined by the characteristic quantity determining unit are transmitted to the open-and closed-loop control unit of the damping system which, for its part, produces on the basis of the characteristic quantities correcting variables for the actuators of the vibration dampers for a desired adjustment of the damping behavior where there is a varying axle load and transmits the correcting variables to the vibration dampers.

The foregoing extends furthermore to a vehicle, in particular a motor vehicle which is fitted with an electronically controlled damping system, as described above, with which it is possible to carry out a control method, as described above.

BRIEF DESCRIPTION OF THE DRAWINGS

The present invention will hereinafter be described in conjunction with the following drawing figures, wherein like numerals denote like elements, and FIG. 1 shows a schematic illustration of a speed/time graph in the damping system according to the invention for detecting a natural frequency of the vehicle body.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Reference will now be made to FIG. 1 which shows, in a schematic illustration of a speed/time graph, the speed of vibrations of the vehicle body relative to the chassis. The natural frequency of the vehicle body is detected using speed sensors positioned on the vehicle body and/or on the vibration dampers, the time expired being plotted as the abscissa and the speed of the vehicle body during a movement in a vertical direction relative to the chassis being plotted as the ordinate.

In the embodiment, the speed of the vehicle body on the front axle and on the rear axle is detected at the same time, a selective assessment of the data being made in the characteristic quantity determining unit. In order that not every minute variation in speed of the vehicle body results in a change in the damping behavior, a "dead band" 1 is introduced which defines threshold values, arranged symmetrically around a zero crossing, for the speed of the vertical upwards and downwards movement of the vehicle body, so that only the speeds of the vehicle body exceeding the thresholds are considered for a control of the damping behavior of the vibration dampers. In the example shown, from first leaving the dead band by falling below the lower threshold, for example during a vertical downwards movement of the vehicle body, characterized by a vertical line with reference numeral 2, a "monitor" is started which is realized as an electronic circuit in the characteristic quantity determining unit. After a reversal in the direction of movement and a re-entry of the speed of the vehicle body into the region of the dead band 1, after a singular zero crossing, the upper threshold of the dead band 1 is exceeded, characterized by the vertical line with reference numeral 3, followed by a renewed reversal in the direction of movement and a re-entry into the dead band 1 and falling below the lower threshold after a single zero crossing, characterized by a vertical line with reference numeral 4, then followed by a re-entry into the dead band 1 and exceeding the upper threshold after a single zero crossing, characterized by a vertical line with reference numeral 5. If the monitor establishes that the speed signal is passing through one of the threshold values of the dead band 1, without having more than just a single zero crossing, then the monitor retains a time index of the last maximum. After detecting two such successive maxima (or as shown in FIG. 1: three successively occurring events of the type: exit/entry/single zero crossing of the dead band), the monitor is terminated. It is easily possible to determine the ratio of a natural frequency of a vibration of the vehicle body with loading to a natural frequency of a vibration of the vehicle body of a selectable vehicle reference condition (for example empty condition without loading) from the time interval $t_{maxmax}$ of the registered successive maxima with the same sign of the speeds of the vehicle body. In this respect, the ratio is formed from the specific time $t_{maxmax}$ to a reference time $t_{ref}$ which belongs to the vehicle reference condition:

$$f_{loading} = t_{maxmax}/t_{ref}$$

The resulting factor $f_{loading}$ corresponds to a value of 1 in the reference condition (for example empty condition without loading) and changes in the case of loading. Whether the natural frequency becomes greater or smaller on loading depends on the course of the spring rate of the vehicle suspension springs between axle and vehicle body over the compression path. The correlation between the factor $f_{loading}$ and the payload is, however, characteristic for each vehicle type.

The factor $f_{loading}$ determined thus is learnt over a relatively long period of time. In so doing, the average of the factors registered hitherto is formed. If a sufficiently large data base is achieved, the characteristic quantity determining unit calculates with the calculated factor an equalizing force for the vibration dampers of the rear axle and optionally of the front axle which is transmitted to the actuators of the vibration dampers after the open-and closed-loop control unit has determined respective correcting variables. The oldest factors in each case are omitted for new incoming factors when the average is formed in the sense of a shift buffer, so that a closed control loop is present. For clarification purposes, the case is also shown in FIG. 1 that the monitor is started, characterized by the vertical line with reference numeral 7, the maximum of the speed is, however, followed by a plurality of zero crossings after a reversal of the direction of movement and a re-entry (reference numeral 8) into the dead band 1, so that the monitor is reset again.

The embodiment shown in FIG. 1 is merely intended to illustrate the invention and is not meant to restrict the invention in any way.

In the present invention, it is possible for a non-parallel vibration behavior, caused by loading, of the front and rear axles of the vehicle to be compensated. For this purpose, a characteristic quantity is determined from the sensor data or from the signals calculated therefrom, which characteristic quantity describes the loading condition. This signal is then used as the basis in calculating additional forces to dampen conditions of increased loading. These loading forces are added to the normal forces which can then be optimized on a reference condition, for example the empty weight condition. In this way, it is possible to avoid the "pumping" or "dipping" action which occurs in particular on the rear axle and the number and harshness of buffering actions can be reduced.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A method for the axle load-dependent control of an electronically controlled damping system in a motor vehicle having a vehicle body, which damping system has at least one vibration damper with an electronically controllable actuator for adjusting a damping behavior of the vibration damper on at least one wheel suspension of the vehicle and an open-and closed-loop control unit actively connected to the actuator for the open-loop/closed-loop control of the damping behavior of the controllable vibration damper, the method comprises the steps of:
  determining at least one characteristic quantity varying with different axle load conditions of an axle of the vehicle based on a natural frequency of vibrations of the vehicle body;
  determining a correcting variable for the actuator of the vibration damper based on the characteristic quantity; and
  transmitting the correcting variable to the actuator of the vibration damper to adjust a damping behavior of the vibration damper.

2. The method according to claim 1, wherein the natural frequency of the vehicle body is determined based on a time interval of detected maximum vibration amplitudes of the vehicle body.

3. The method according to claim 1, wherein the natural frequency of the vehicle body is determined based on a time interval of detected maximum speeds of vibrations of the vehicle body.

4. The method according to claim 1, further comprising the step of determining a characteristic quantity varying with different axle load conditions of a front axle and a rear axle of the vehicle.

5. The method according to claim 1, wherein the characteristic quantity varying with different axle load conditions of an axle of the vehicle is also determined based on a detected height level value of the vehicle body relative to the chassis.

6. Electronically controlled damping system in a motor vehicle, the system comprising:
- at least one vibration damper with an electronically controllable actuator to adjust a damping behavior of the vibration damper on at least one wheel suspension of the vehicle;
- an open-and closed-loop control unit actively connected to the actuator for the open-loop/closed-loop control of the damping behavior of the at least one vibration damper; and
- a characteristic quantity determining unit for determining a characteristic quantity which varies with different axle load conditions of the vehicle based on a natural frequency of vibrations of the vehicle body;

wherein the open-and closed-loop control unit determines a correcting variable for the actuator of the vibration damper based on the characteristic quantity and transmits the correcting variable to the actuator of the vibration damper to adjust a damping behavior of the vibration damper.

7. Electronically controlled damping system according to claim 6, wherein the characteristic quantity determining unit for determining a characteristic quantity varying with different axle load conditions of the vehicle is integrated into the open-and closed-loop control unit of the damping system.

* * * * *